No. 765,673. PATENTED JULY 26, 1904.
B. F. McTEAR.
MANUFACTURE OF TUBES OR HOLLOW BODIES.
APPLICATION FILED APR. 27, 1903.
NO MODEL. 6 SHEETS—SHEET 5.

WITNESSES
H. M. Kuehne
John A. Percival

INVENTOR
Balfour Fraser McTear
BY
ATTORNEYS

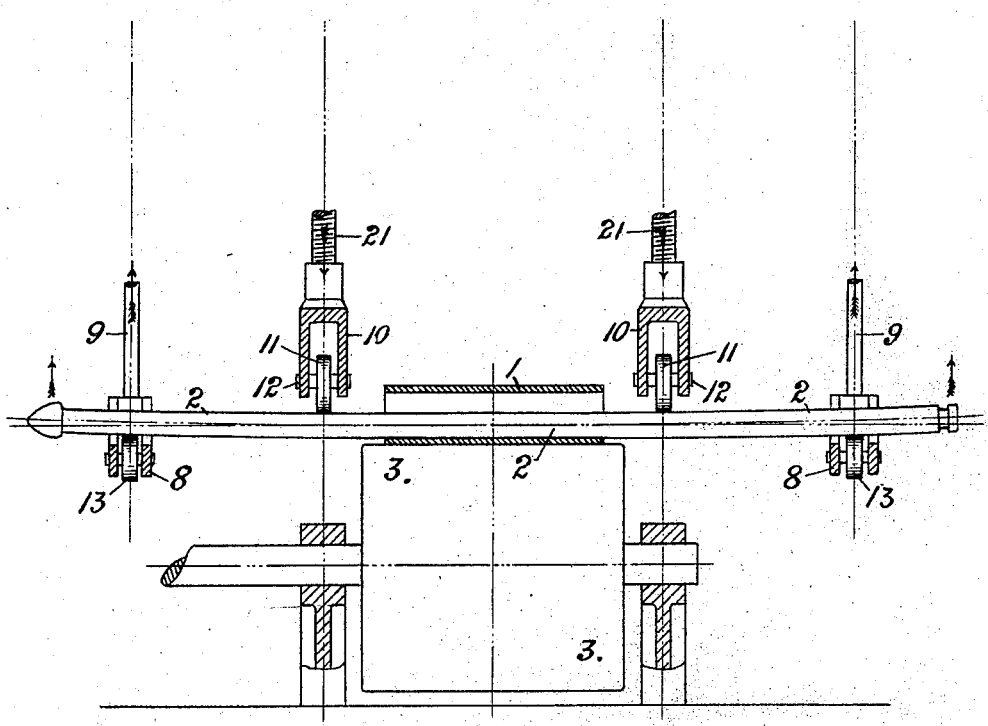

No. 765,673. Patented July 26, 1904.

UNITED STATES PATENT OFFICE.

BALFOUR FRASER McTEAR, OF RAINHILL, ENGLAND.

MANUFACTURE OF TUBES OR HOLLOW BODIES.

SPECIFICATION forming part of Letters Patent No. 765,673, dated July 26, 1904.

Application filed April 27, 1903. Serial No. 154,596. (No model.)

*To all whom it may concern:*

Be it known that I, BALFOUR FRASER MC-TEAR, engineer, a subject of the King of England, and a resident of Rainhill, in the county of Lancaster, England, have invented certain new and useful Improvements in or Connected with the Manufacture of Tubes or Hollow Bodies, of which the following is a specification.

This invention has reference mainly to the manufacture of tubes and hollow cylinders or cylindrical bodies of steel or other hard metals or alloys; and it has more particularly for its objects and effects to provide improved machinery and new or improved modes of operating upon or manipulating tubular bodies in the process of manufacture in the machine, whereby the crude or rough hollow billets or bodies (generally externally cylindrical bodies) while in a highly heated or glowing state have the thickness of their walls reduced and their diameter increased and are rendered truly cylindrical and of uniform thickness annularly and throughout their length and rapidly. All the operations are carried on in the one machine, and this, together with the several improvements connected with the manipulation and operation upon the hollow body and the various functions and modes of manipulating and applying the several parts of the machinery are hereinafter described. The article being operated upon will consist of a hollow body with comparatively thick walls, which have to be reduced in thickness, the reduction producing a corresponding increase in diameter. For convenience this article is hereinafter generally called the "billet." The article produced in this machine may be a tube, cylinder, boiler-flue, or other hollow body of the finished size and thickness required, or it may constitute a partly-manufactured article, which has to be subsequently operated upon or treated to produce the finished article required.

The invention and various improvements connected with it will be described with the aid of the accompanying drawings, illustrating it.

Figure 1:
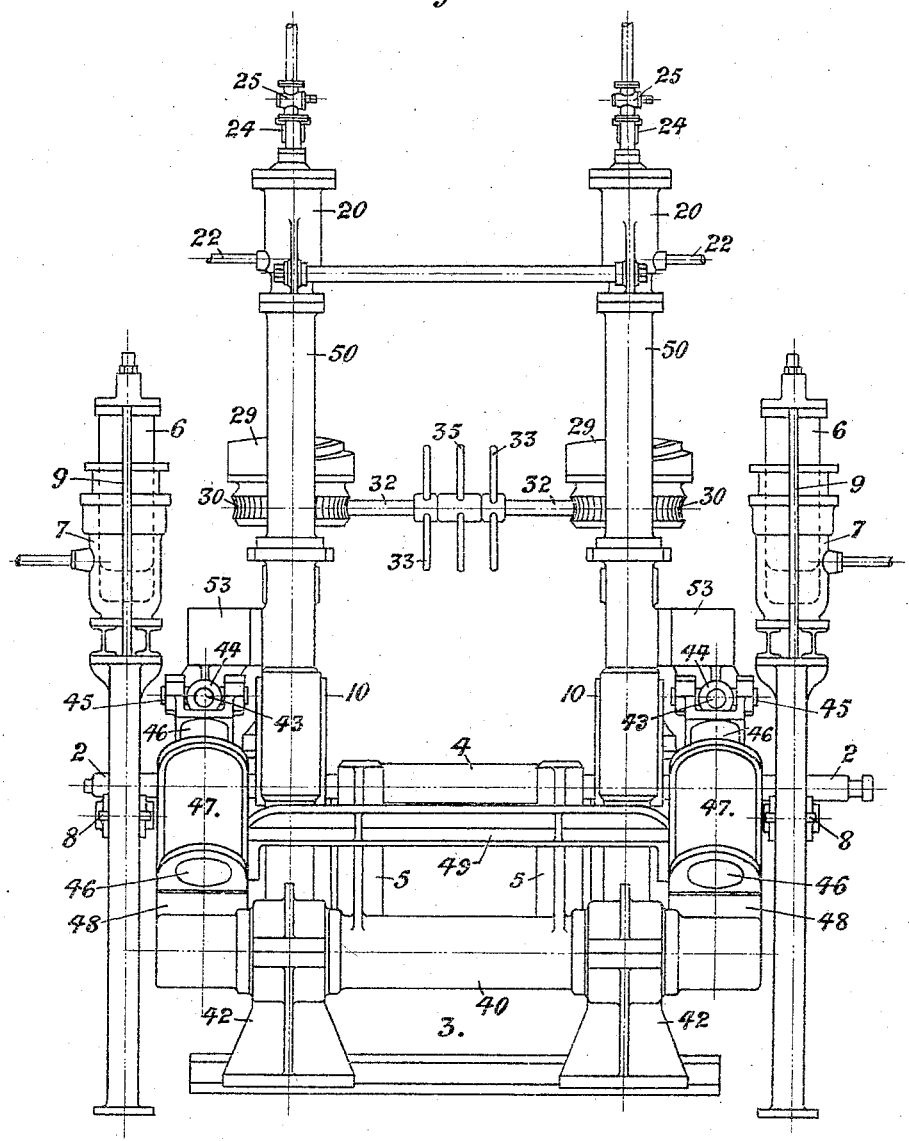
Figure 2:
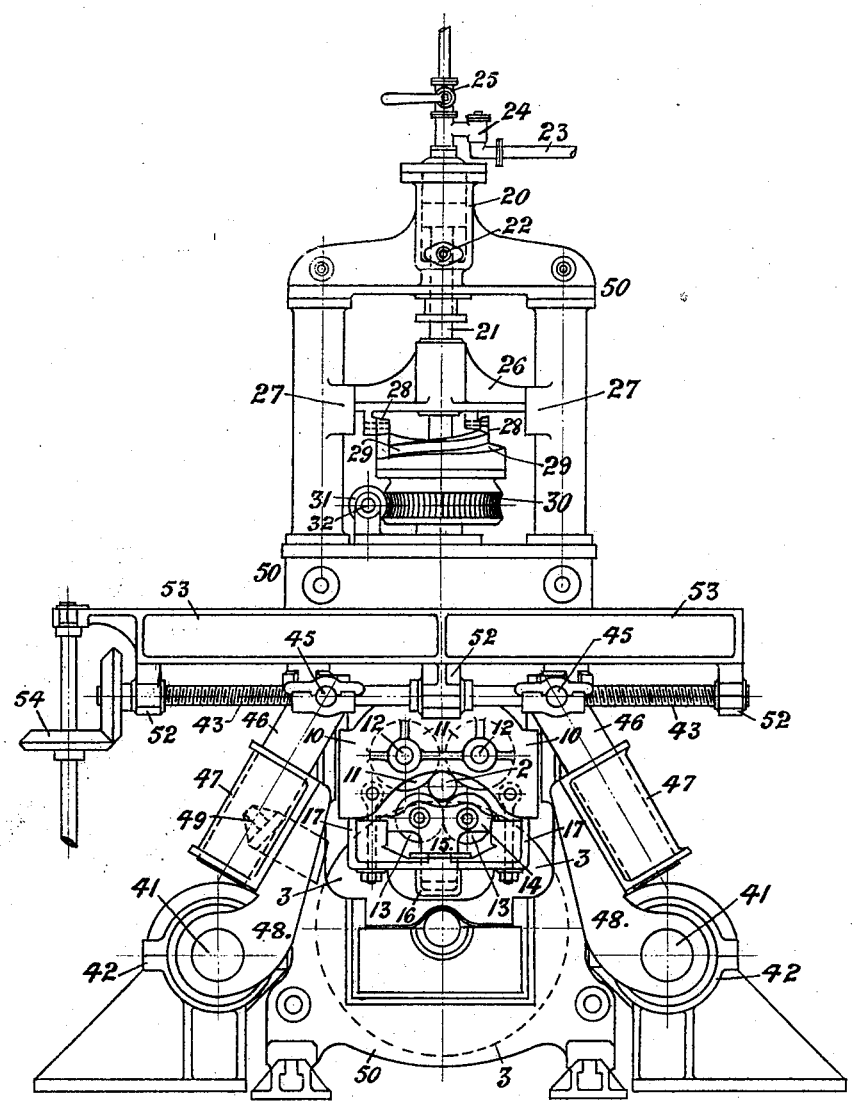
Figure 3:
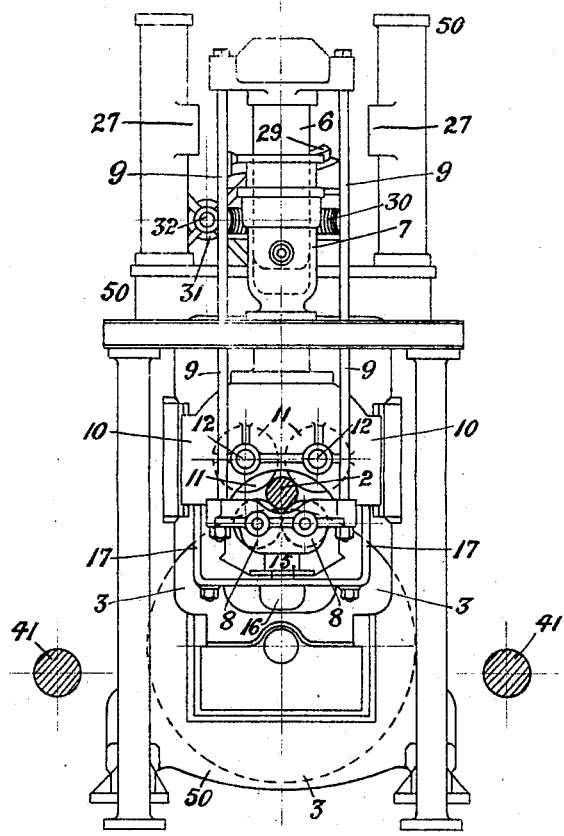
Figure 4:
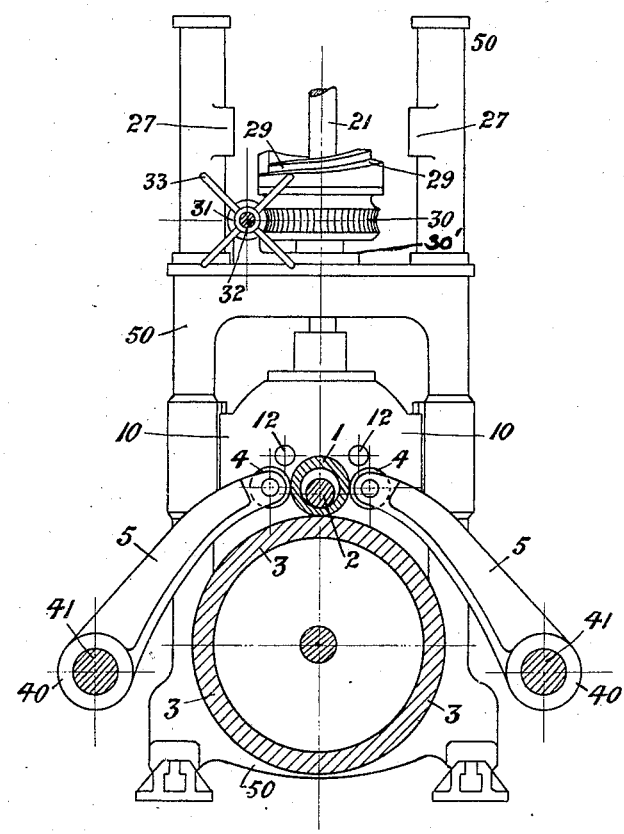
Figure 5:
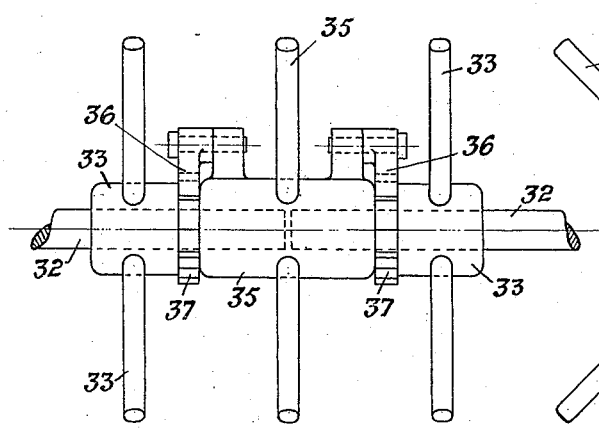
Figure 6:
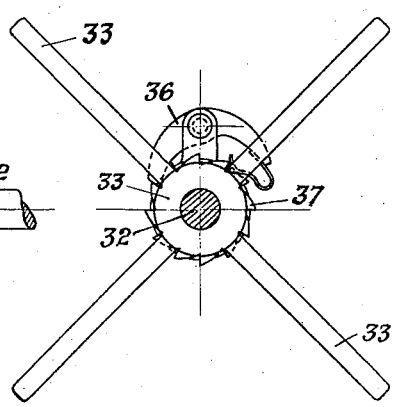

In the drawings, Figure 1 is a side elevation, and Fig. 2 is an end elevation, of the machine. Fig. 3 is an end elevation showing the outside lifting-bearings, and Fig. 4 is a transverse section of the machine. Fig. 5 is a side elevation, and Fig. 6 an end elevation, showing the main bearing-operating mechanism. Fig. 7 is a diagrammatic view showing the supports in their relation to the mandrel.

Referring now generally to the drawings, the billet 1, when being operated upon, is highly heated, and it is revolved and rolled internally and externally between an internal small mandrel-roller 2 and a large external supporting or anvil roller 3 at a high velocity—say from about one thousand to two thousand peripheral feet per minute—the operation being one of hot "spinning." This roller 3 is the driven roller.

The mandrel-roller 2 is adjusted toward the other roller, 3, during the operation of rolling by bearings 10, carrying wheels or devices 11, mounted on axles 12 and moved up and down in the main frames or housings 50.

Prior to the rolling action when the billet 1 has been placed in position in the machine on the anvil-roller 3 the mandrel-roller 2 is threaded longitudinally through the billet 1 and under the bearings 10.

Outside the billet there are external side-supporting rollers 4, supported by hinged arms 5, which act in connection with the part of the billet at or near its maximum diameter, viewed in relation to the vertical plane of the machine and follow its increasing diameter as the billet blooms in the mill. These rollers 4 assist in keeping the billet in its cylindrical shape while being spun and also hold it positively axially in relation to the axis of the mandrel-roller. It is thus supported and governed throughout the whole of its progressive diametrical increase.

Regarding now the present improvements and invention, there is sometimes a tendency to the billets shortening and a thickening up toward the middle, while in other cases, conversely, especially in longer billets, the tendency is to stretch lengthwise, and when this stretching takes place the blooming or increase of diameter of the billet stops or does not take place, parts of the billet in some cases not being rolled at all. According to this invention (assuming the rollers 4 to be set so as to support the billet as described) defects are overcome by artificially bending the middle part of the mandrel-roller 2 between the main bearings 10 down toward the anvil-roller by pulling in the opposite direction on its ends, which project outside the main bearings 10. This is effected, preferably, by hydraulic rams 6, working in cylinders 7 and carrying and operating bearings 8 outside the main bearings 10, the rams 6 and bearings 8 being connected by rods 9. By regulating the pressure of water supplied to the ram-cylinders 7 the mandrel can be kept straight or its degree of cant can be governed. A further feature connected with the main bearings 10 is the employment of bearings on the under side of the mandrel 2, which are normally pressed upward when the machine is rolling by hydraulic or other power. The employment of this upward pressure prevents vibration, which is otherwise sometimes excessive, due, it is found, to the mandrel 2 leaving one side of the main pressing-down bearing-disks 11 and flying back to same, this being caused by the action of rotation of the driven anvil-roller 3. In the construction shown these under bearings each consist of disk-wheels 13, carried by axles similarly to the disks 11 and mounted in a cross-head 14 on a ram 15, working in a cylinder 16, carried by a frame 17, said frame being suspended from or connected with the main bearing-boxes 10. Before the mandrel 2 is threaded through the billet at the commencement of the rolling operation and after this operation these hydraulic cylinders 16 will be exhausted, and the rams 15 and bearing-disks 13 will be lowered down; but during the rolling action the ram and its bearings will be pressed up onto the mandrel 2, and they will keep it against the bearing-disks 11, and so prevent all vibration which might otherwise take place at this locality.

The main bearing-boxes 10 are moved down and up by pistons working in the cylinders 20 hydraulically, the pistons being connected with the boxes 10 by rods 21. The upward stroke is simply effected by letting the pressure-water in on the under side of the pistons of the cylinders 20; but the mandrel-feeding stroke is governed mechanically and positively and controlled by hand, and the hydraulic pressure merely does the actual downward-pressing work, as it is allowed to do so by the controlling mechanism.

The pressure-water is supplied to the bottom of the cylinder 20 and under side of the pistons by a pipe 22 and to the upper end by a pipe 23, having a non-return valve 24 upon it, the exhaust being effected by a cock 25, operated by hand. Of course the cocks 25 would be closed when pressure-water is supplied to the top of the cylinders 20.

The mandrel downward-feed-controlling mechanisms each comprise a cross-head 26, fixed on the rod 21 and working up and down between guides 27 on the main housing 50 and having rollers 28, which rest on two separate spiral cam-paths or cams 29, mounted on the upper end of the worm-wheels 30, and which rest on a sleeve 30', surrounding the rod 21 and secured to the frame 50, said worm-wheels revolving round the shafts 21. These worm-wheels 30 are revolved by worms 31, fixed on two separate shafts 32 in line, and these shafts 32 are adapted to be separately operated by the spoke-wheels 33, fixed on their ends between the housings 50. (See Figs. 5 and 6.) By revolving these shafts 32 the worm-wheels 30 are revolved, and in the feeding-down action they are revolved in the direction which allows the cross-heads 26, with the rods 21, to be pressed down. Of course the rollers 28 will always be pressing on the cam-paths 29. In this downward-feeding action when one or both of the shafts 32 are stopped the downward-feeding action of the bearings 10 and mandrel 2 is stopped and governed. This mechanical governing mechanism, as will be seen, gives complete control of the downward movement of the mandrel, and the two feeding-down hand-wheels 33 being independent the feeding down of the opposite ends of the mandrel may be carried on at equal rates or at varying rates and amounts, whereby absolute obedience as regards the longitudinal position or travel of the billet to the manipulation of this differential pressing and feeding method is obtained.

To enable the two bearings 10 and the mandrel 2 to be moved down at the same rate, a third hand-actuated spoke-wheel 35 is introduced between the wheels 33, and the ends of the shafts 32 rest loosely in the boss of this wheel. The wheels 33 are fixed on the shafts 32; but the wheel 35 is loose upon them, and they simply rotate in the said wheel without causing it to move, and it drives the wheels 33 by pawls 36, carried on its hub, which engage with a ratchet-wheel 37 on the hubs of wheels 33. Thus while the wheel 35 is stationary the pawl 36 simply slips over the ratchet-wheels 37 without engaging the same; but when the wheel 35 is rotated the pawls engage the teeth of the ratchet-wheels and rotate both the wheels 33.

When a differential rate of feeding is required, of course the wheels 33 are manipulated; but so long as an even rate is required the wheel 35 may be manipulated.

It is important that the rollers 4 shall be rigidly kept in the position and angle which they are set in, and to accomplish this the arms 5, which carry them, are mounted or cast in one, with a strong sleeve 40, fixed on the shaft 41, mounted in the bearings 42, and the shafts 41 are operated from each end of the machine by a right and left hand threaded rod 43, working in nuts 44, such nuts having pinions 45, fitting in the ends of slides 46, mounted and sliding in cylinders 47 on arms 48, fixed on the shafts 41, and these arms 48 and cylinders 47 being rigidly coupled up together and with the arms 5 by girders 49. By this construction and mode of operation and by revolving the threaded shafts 43 together at the same speed the rollers 4 cannot shift or be pressed out of their required alinement through torsion of the supporting-shaft or elasticity, and they cannot vibrate to any serious extent.

The shafts 43 are suitably supported by bearings 52, carried on girders 53, fixed on the sides of the housing 50, and they will be revolved through beveled wheels 54 upon them, driven in any suitable known way or gearing from an operating-wheel, or they may be driven by worm-gearing or any other suitable kind of gearing.

Having now particularly described my invention, what I claim as new, and desire to secure by Letters Patent, is—

1. In machinery for manufacturing tubes or hollow bodies by internal and external rolling, an internal roller: an external roller: main adjusting or moving bearings mounted and working in the frames of the machine at either end of same: and normally upwardly pressed bearings outside said frames by which the operation of the internal roller between the main adjusting-bearing is normally bent toward the external roller.

2. In machinery for manufacturing tubes or hollow bodies, by internal and external rolling, an internal mandrel-roller: an external roller: main mandrel-roller bearings adapted to bear upon the side of the said roller opposite the external roller: and normally upwardly pressed bearings below and connected with said main bearings, adapted to press and keep the mandrel-roller against the bearing parts of the main bearings: substantially as set forth.

3. In machinery for manufacturing tubes or hollow bodies by internal and external rolling, a moved internal mandrel-roller 2: an external anvil-roller 3: the main wheel-bearings 11 having their axes carried by the vertically-adjustable bearing-boxes 10, and parallel with the axis of the mandrel-roller and anvil-roller: and the supplementary roller-bearings 13 carried by and normally pressed up by hydraulic rams 15, and connected with said main bearings: substantially as herein set forth.

4. In machinery for manufacturing tubes or hollow bodies by internal and external rolling: a moved internal mandrel-roller: an external anvil-roller: main mandrel supporting and moving bearings: a hydraulic cylinder and piston connected with said bearings and adapted to press said bearings onto the mandrel-roller: and a hand-operated mechanical controlling mechanism connected with said bearings and hydraulic portion, adapted to limit and control continuously during the operation, the movement of said bearings by the hydraulic pressure: substantially as described.

5. In machinery for manufacturing tubes or hollow bodies, by internal and external rolling: a moved internal mandrel-roller 2: an external anvil-roller 3: main mandrel-roller-bearing operating hydraulic cylinders 20 with pistons disposed above said bearings: rods 21 connecting said pistons and bearings: and rotary governing and controlling mechanism on said rods adapted to be rotated and operated by hand: substantially as herein set forth.

6. In machinery for manufacturing tubes or hollow bodies, by internal and external rolling, a movable internal mandrel-roller 2: an external anvil-roller 3: main frames 50: main bearing in said frames for bearing upon the upper portion of said roller 2: the external mandrel-bearings 8, outside said main frames and bearing on the under side of said roller 2: and a hydraulic ram 6, and cylinder 7 connected with bearings 8: as set forth.

7. In machinery for manufacturing tubes or hollow bodies, by internal and external rolling, a movable internal mandrel-roller 2: an external anvil-roller 3: the main bearings 10: the main frames 50: the hydraulic cylinder 20, with pistons therein: rods 21 connecting said pistons and bearings: worm-wheels 30 on said rods, with cams on their upper surface: a cross-head or frame 26, on the rods 21, adapted to operate in connection with said cams: and worms 31 operating said worm-wheels: substantially as set forth.

8. In machinery for manufacturing tubes or hollow bodies, by internal and external rolling, a movable internal anvil-roller 3, main frames 50: side-supporting rollers 4: arms 5 carrying said rollers 4: supporting-shaft 41: bearings 42: right and left hand threaded screws 43 outside said frames: nuts 44 on said shafts 41: and extensible arms 46, 47, mounted on the shaft 41, outside said bearings: substantially as herein set forth with reference to the drawings.

In witness whereof I have hereunto set my hand in presence of two witnesses.

BALFOUR FRASER McTEAR.

Witnesses:
SOMERVILLE GOODALL,
JOHN H. WALKER.